(12) United States Patent
Painter et al.

(10) Patent No.: US 11,824,248 B2
(45) Date of Patent: Nov. 21, 2023

(54) SHIELDED BRIDGES FOR QUANTUM CIRCUITS

(71) Applicant: CALIFORNIA INSTITUTE OF TECHNOLOGY, Pasadena, CA (US)

(72) Inventors: Oskar Painter, Sierra Madre, CA (US); Seyed Mohammad Mirhosseini Niri, Pasadena, CA (US); Eun Jong Kim, Pasadena, CA (US); Alp Sipahigil, Pasadena, CA (US); Vinicius Thaddeu dos Santos Ferreira, Pasadena, CA (US); Andrew J. Keller, Los Angeles, CA (US); Mahmoud Kalaee, Pasadena, CA (US); Michael T. Fang, Pasadena, CA (US)

(73) Assignee: California Institute of Technology, Pasadena, CA (US)

(*) Notice: Subject to any disclaimer, the term of this patent is extended or adjusted under 35 U.S.C. 154(b) by 417 days.

(21) Appl. No.: 17/127,605

(22) Filed: Dec. 18, 2020

(65) Prior Publication Data

US 2021/0151844 A1    May 20, 2021

Related U.S. Application Data

(62) Division of application No. 16/293,416, filed on Mar. 5, 2019, now Pat. No. 10,916,821.

(60) Provisional application No. 62/652,765, filed on Apr. 4, 2018, provisional application No. 62/638,755, filed on Mar. 5, 2018.

(51) Int. Cl.
*H01P 3/00* (2006.01)
*G06N 10/00* (2022.01)

(52) U.S. Cl.
CPC ............... *H01P 3/00* (2013.01); *G06N 10/00* (2019.01); *G02F 2202/30* (2013.01)

(58) Field of Classification Search
CPC ................................ H01P 3/003; G06N 10/00
See application file for complete search history.

(56) References Cited

U.S. PATENT DOCUMENTS

| 6,518,637 B1 | 2/2003 | Thompson et al. |
| 7,295,153 B2 | 11/2007 | Williams |
| 7,391,288 B1 | 6/2008 | Itoh et al. |
| 7,509,014 B2 | 3/2009 | Hatsuda et al. |

(Continued)

OTHER PUBLICATIONS

U.S. Appl. No. 16/293,416 , "Notice of Allowance", dated Sep. 24, 2020, 10 pages.

(Continued)

*Primary Examiner* — Andrea Lindgren Baltzell
*Assistant Examiner* — Alan Wong
(74) *Attorney, Agent, or Firm* — Kilpatrick Townsend & Stockton LLP

(57) ABSTRACT

A shielded bridge for a coplanar waveguide (CPW) includes a signal bridge extending from a first terminal of the CPW to a second terminal of the CPW. The signal bridge has a raised central portion that extends over a separate signal conductor. The shielded bridge for the CPW also includes a ground bridge extending from a first ground plane on a first side of the separate signal conductor to a second ground plane on a second side of the separate signal conductor. The ground bridge is positioned between the signal bridge and the separate signal conductor.

17 Claims, 14 Drawing Sheets

(56) References Cited

U.S. PATENT DOCUMENTS

| | | | |
|---|---|---|---|
| 8,222,065 B1 | 7/2012 | Smeys et al. | |
| 8,242,799 B2 | 8/2012 | Pesetski et al. | |
| 8,519,803 B2 | 8/2013 | McLaren et al. | |
| 8,947,317 B2 | 2/2015 | Ueda et al. | |
| 9,525,398 B1 | 12/2016 | Olsson et al. | |
| 9,843,312 B2 | 12/2017 | Abdo | |
| 10,218,045 B2* | 2/2019 | Laighton | H01P 3/003 |
| 10,381,708 B2* | 8/2019 | Olivadese | H01P 7/086 |
| 10,431,866 B2* | 10/2019 | Adiga | H10N 69/00 |
| 10,491,221 B1 | 11/2019 | Mckay et al. | |
| 10,528,887 B2* | 1/2020 | Chen | G06N 20/10 |
| 10,858,239 B2 | 12/2020 | Painter et al. | |
| 10,858,240 B2 | 12/2020 | Painter et al. | |
| 10,916,821 B2 | 2/2021 | Painter et al. | |
| 11,171,395 B2* | 11/2021 | Arai | H01P 1/022 |
| 11,311,274 B2 | 4/2022 | Rothberg et al. | |
| 11,440,792 B2 | 9/2022 | Painter et al. | |
| 11,575,077 B2* | 2/2023 | Adiga | H10N 60/82 |
| 11,605,586 B2* | 3/2023 | Chan | H01L 23/4821 |
| 11,658,373 B2* | 5/2023 | Xu | H01P 1/162 |
| | | | 333/239 |
| 2013/0200394 A1 | 8/2013 | Sung | |
| 2016/0202414 A1 | 7/2016 | Englund et al. | |
| 2017/0346149 A1 | 11/2017 | Ciubotaru et al. | |
| 2018/0164432 A1 | 6/2018 | Lal et al. | |

OTHER PUBLICATIONS

U.S. Appl. No. 16/293,455, "Notice of Allowability", dated Oct. 19, 2020, 5 pages.

U.S. Appl. No. 16/293,455, "Notice of Allowance", dated Aug. 5, 2020, 12 pages.

U.S. Appl. No. 16/293,457, "Corrected Notice of Allowability", dated Oct. 19, 2020, 6 pages.

U.S. Appl. No. 16/293,457, "Notice of Allowance", dated Aug. 5, 2020, 13 pages.

U.S. Appl. No. 17/087,400, "Corrected Notice of Allowability", dated Jul. 22, 2022, 2 pages.

U.S. Appl. No. 17/087,316, "Non-Final Office Action", dated May 26, 2022, 10 pages.

U.S. Appl. No. 17/087,400, "Ex Parte Quayle Action", dated Mar. 3, 2022, 7 pages.

U.S. Appl. No. 17/087,400, "Notice of Allowance", dated Apr. 28, 2022, 9 pages.

U.S. Appl. No. 17/087,316, "Notice of Allowance", dated Jan. 11, 2023, 7 pages.

U.S. Appl. No. 17/866,281, "Non-Final Office Action", dated Jul. 3, 2023, 13 pages.

\* cited by examiner

Optional Resist Reflow

Metal Evaporation

US 11,824,248 B2

SHIELDED BRIDGES FOR QUANTUM CIRCUITS

CROSS-REFERENCES TO RELATED APPLICATIONS

This application is a divisional of U.S. patent application Ser. No. 16/293,416, filed on Mar. 5, 2019, which claims priority to U.S. Provisional Patent Application No. 62/652,765, filed on Apr. 4, 2018, entitled "Compact, Low Loss, Low Disorder, Microwave Metamaterials for Superconducting Quantum Circuits" and to U.S. Provisional Patent Application No. 62/638,755, filed on Mar. 5, 2018, entitled "Hopovers: Airbridges for Reduced Crosstalk in Superconducting Circuits", the disclosures of which are hereby incorporated by reference in their entirety for all purposes.

The following regular U.S. patent applications are incorporated by reference into this application for all purposes:
application Ser. No. 16/293,455, filed Mar. 5, 2019, entitled "TECHNIQUES FOR TRANSDUCTION AND STORAGE OF QUANTUM LEVEL SIGNALS"; and
application Ser. No. 16/293,457, filed Mar. 5, 2019, entitled "TECHNIQUES FOR BIDIRECTIONAL TRANSDUCTION OF QUANTUM LEVEL SIGNALS BETWEEN OPTICAL AND MICROWAVE FREQUENCIES USING A COMMON ACOUSTIC INTERMEDIARY".

STATEMENT AS TO RIGHTS TO INVENTIONS MADE UNDER FEDERALLY SPONSORED RESEARCH OR DEVELOPMENT

This invention was made with government support under Grant No. PHY1125565 awarded by the National Science Foundation and under grant No(s) FA9550-15-1-0015 & FA9550-16-1-0323 awarded by the Air Force. The government has certain rights in the invention.

BACKGROUND OF THE INVENTION

Quantum computing employs quantum bits (commonly abbreviated as "qubits") to represent data and is of interest for modeling quantum systems and implementing quantum algorithms. Quantum systems can include, for example, particles, atoms, molecules, and materials; dynamics such as chemical reactions may also be modeled. Quantum algorithms can include, for example, Grover's algorithm to efficiently search through a large dataset. To perform quantum modeling or implement quantum algorithms, information must be transferred between independent qubits via a quantum bus, which is a loose analog of a traditional computing bus.

Superconducting qubits based on Josephson junctions conventionally operate and communicate at microwave frequencies (2-10 GHz) using extremely small quantities of energy and each qubit requires specialized coherent excitation and readout structures that also operate at similar frequencies. As the number of qubits in a quantum processor is increased, these characteristics result in complex interconnect and routing schemes that limit scalability of the quantum processor.

Despite the progress made related to the formation of quantum processors, there is a need in the art for improved methods of quantum communications and qubit interconnect structures to enable increased scalability of quantum circuits.

SUMMARY OF THE INVENTION

In some embodiments a waveguide for communicatively coupling qubits comprises a longitudinal signal conductor extending across a surface of a dielectric substrate and a periodic array of lumped element resonators distributed along and electrically coupled to the signal conductor. The resonators create a bandgap within an operating bandwidth of the waveguide wherein all wavelengths within the bandgap are larger than geometrical extents of each of the resonators. In various embodiment the qubits are configured to communicate within a communication band that is defined within the operating bandwidth.

In some embodiments a communication distance within which qubits can communicate via the waveguide is controlled in response to changing a center frequency of the communication band. In various embodiments when operating within the bandgap, increasing the center frequency of the communication band results in an increase in communication distance within which qubits can communicate. In some embodiments all wavelengths within the bandgap are at least 10 times larger than the geometrical extents of each of the resonators. In various embodiments each of the resonators includes one or more capacitive and one or more inductive structures.

In some embodiments each of the resonators are capacitively coupled to the signal conductor. In various embodiments the resonators are arranged in pairs that include a first resonator positioned on a first side of the signal conductor and a second resonator positioned opposite the first resonator on a second side of the signal conductor.

In some embodiments a shielded bridge for a coplanar waveguide (CPW) comprises a signal bridge extending from a first terminal of the CPW to a second terminal of the CPW, wherein the signal bridge has a raised central portion that extends over a separate signal conductor. A ground bridge extends from a first ground plane on a first side of the separate signal conductor to a second ground plane on a second side of the separate signal conductor, wherein the ground bridge is positioned between the signal bridge and the separate signal conductor.

In some embodiments a first gap is defined between the separate signal conductor and the ground bridge and a second gap is defined between the signal bridge and the ground bridge. In various embodiments the first and second gaps are filled with air. In some embodiments a width of the signal bridge is equal to or greater than a width of the ground bridge. In various embodiments a width of the ground bridge is greater than a width of the signal bridge. In some embodiments the ground bridge is configured to shield the signal bridge from crosstalk between the signal bridge and the separate signal conductor.

In some embodiments a method of forming a shielded bridge for a coplanar waveguide (CPW) comprises depositing one or more first electron beam (e-beam) resist layers on a dielectric substrate and performing 3-D grayscale lithography on the one or more first e-beam resist layers to create removable portions and a tenacious portion of the one or more first e-beam resist layers. The removable portions of the one or more first e-beam resist layers are removed such that the tenacious portion of the one or more first e-beam resist layers remains and extends between a first termination region and a second termination region. A first layer of metal is deposited to form a ground bridge that extends from the first termination region, across the tenacious portion of the one or more first e-beam resist layers, to the second termination region, such that the ground bridge is electrically coupled to the first and second termination regions. One or more second e-beam resist layers are deposited on the dielectric substrate and 3-D grayscale lithography is performed on the one or more second e-beam resist layers to create removable regions and a tenacious region of the one or more second e-beam resist layers. The removable regions of the one or more second e-beam resist layers are removed such that the tenacious region of the one or more second e-beam resist layers remains and extends between a first terminal and a second terminal of the CPW. A second layer of metal is deposited to form a signal bridge that extends from the first terminal of the CPW, across the tenacious region of the one or more second e-beam resist layers to the second terminal of the CPW such that the signal bridge is electrically coupled to the first and second terminals of the CPW and all remaining portions of the one or more second e-beam resist layers are removed.

In some embodiments a reflow of the tenacious portion of one or more first e-beam resist layers is performed before depositing the first layer of metal. In various embodiments a reflow of the tenacious region of the one or more second e-beam resist layers is performed before depositing the second layer of metal.

In some embodiments a first gap is defined between the ground bridge and the substrate and a second gap is defined between the ground bridge and the signal bridge. In various embodiments a width of the ground bridge is greater than a width of the signal bridge. In some embodiments in-situ ion etching is performed before depositing the first and the second layers of metal.

To better understand the nature and advantages of the present disclosure, reference should be made to the following description and the accompanying figures. It is to be understood, however, that each of the figures is provided for the purpose of illustration only and is not intended as a definition of the limits of the scope of the present disclosure. Also, as a general rule, and unless it is evident to the contrary from the description, where elements in different figures use identical reference numbers, the elements are generally either identical or at least similar in function or purpose.

DETAILED DESCRIPTION OF SPECIFIC EMBODIMENTS

Figure 1:
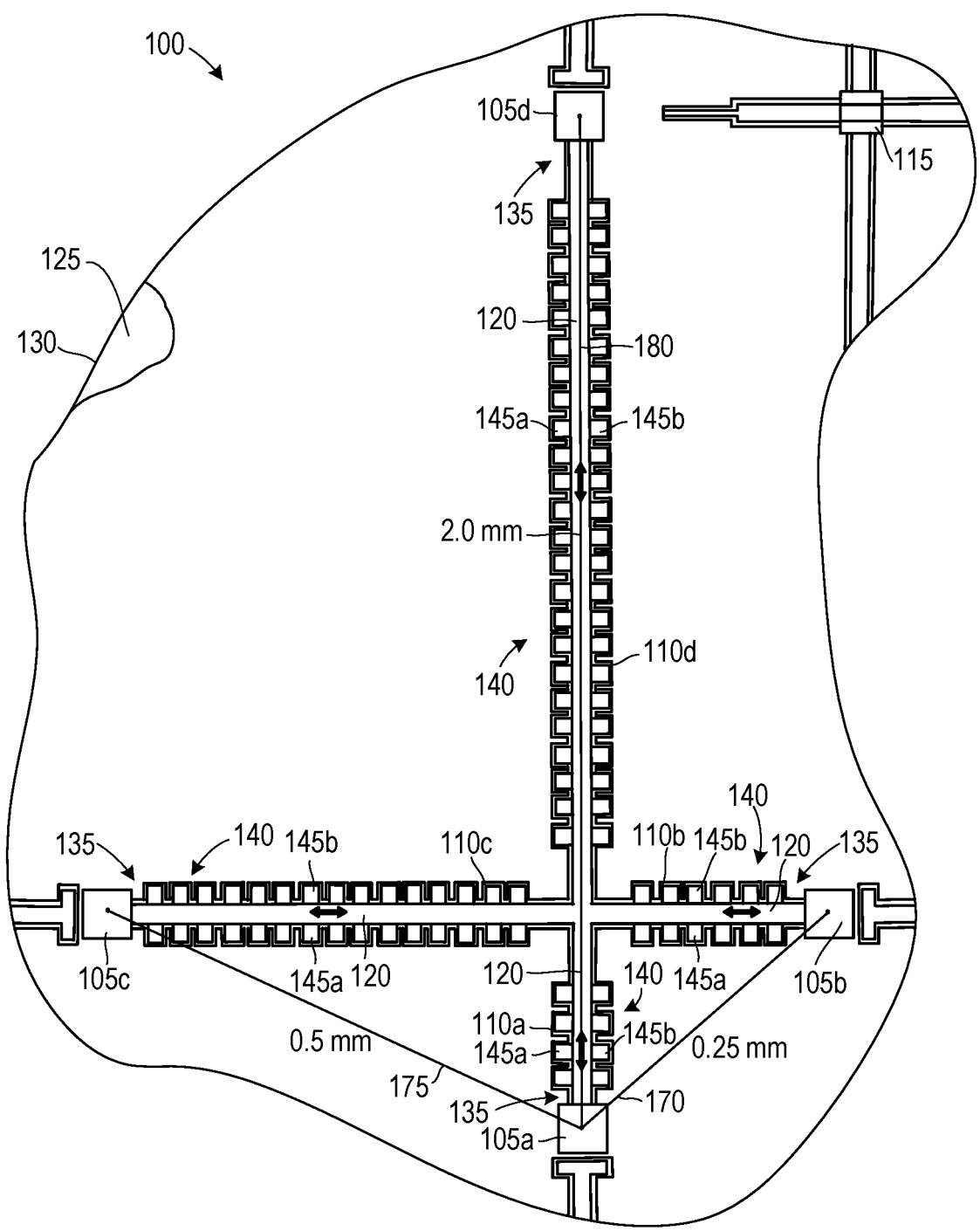
FIG. 1 is a simplified conceptual layout of a quantum computing communication circuit according to an embodiment of the present invention.

The present invention relates generally to methods and systems for quantum computing. More specifically, the present invention relates to methods and systems for quantum communications and qubit interconnect structures enabling increased scalability of quantum computing systems.

In order to better appreciate the features and aspects of the present disclosure, further context for the disclosure is provided in the following section by discussing one particular implementation of a quantum computing system that includes metamaterial waveguides and shielded bridges according to embodiments of the disclosure. These embodiments are for explanatory purposes only and other embodiments may be employed in other configurations. For example, embodiments of the disclosure can also be used to couple coplanar waveguide structures to qubits.

Some embodiments of the present disclosure relate to metamaterial waveguides that are used to communicatively couple one or more qubits on a "quantum bus". As defined herein, communicatively coupling one or more qubits shall mean coupling qubits such that a first qubit changes state based on a state of a second qubit. For example, a first qubit can transfer energy to a second qubit to increase an energy level of the second qubit and decrease an energy level of the first qubit, or the transfer in energy can result in an increase in frequency of the second qubit and a decrease in frequency of the first qubit. In other embodiments the transfer of energy can result in other changes to the first and the second qubits.

In some embodiments the amount of energy transferred between qubits can be a single microwave photon. The metamaterial waveguides can include a signal conductor that has a periodic array of lumped element resonator pairs distributed along and electrically coupled to the signal conductor. The waveguide can be referred to as a metamaterial waveguide due to the sub-wavelength patterning of the signal conductor which occurs due to the periodically coupled resonator pairs and because the geometrical extents of each resonator pair is at least 10 times smaller than all wavelengths under consideration. The periodic array of resonators defines a bandgap within an operating bandwidth of the waveguide. Qubits can be configured to communicate at a communication band within the operating bandwidth of the waveguide and changing a center frequency of the communication band can be used to control which qubits communicate over the quantum bus.

In another embodiment a shielded bridge is used to cross high frequency communications and control coplanar waveguides (CPW's) in a quantum computing circuit and provide improved crosstalk isolation between the CPW's. More specifically, when two CPW's cross each other, a shielded bridge can be used to extend a first CPW over a second CPW where the shielded bridge includes a signal bridge and a ground bridge. The signal bridge is elevated and extends over the second CPW, with the ground bridge positioned between the signal bridge and the second CPW. In some embodiments the ground bridge functions both as a shield to minimize crosstalk between the first and second CPW's and as a ground path for the signal bridge to maintain impedance as the first CPW crosses the second CPW.

In order to better appreciate the features and aspects of metamaterial waveguides and shielded bridges for quantum computing circuits according to the present disclosure, further context for the disclosure is provided in the following section by discussing one particular implementation of a quantum computing circuit according to embodiments of the present disclosure. These embodiments are for example only.

Metamaterial Waveguide

FIG. 1 is a simplified conceptual layout of a four qubit quantum computing communication circuit 100 according to an embodiment of the present invention. As illustrated in FIG. 1, four separate qubits 105a . . . 105d are coupled to one another via metamaterial waveguides 110a . . . 110d, and a shielded bridge 115 is used to cross signal lines, as described in more detail below.

Metamaterial waveguides 110a . . . 110d can be used to communicatively couple qubits 105a . . . 105d to one another and can also be used to control which qubits communicate with each other, as described in more detail below. Each waveguide 110a . . . 110d includes a longitudinal signal conductor 120 extending across a surface 125 of a dielectric substrate 130. Extending from each qubit 105a . . . 105d, a first portion 135 of signal conductor 120 is a coplanar waveguide structure that transitions to a second portion 140 that is a metamaterial waveguide having a periodic array of lumped element resonator pairs 145a, 145b distributed along and electrically coupled to the signal conductor. Each resonator pair 145a, 145b includes a first resonator 145a positioned on a first side of signal conductor 120 and a second resonator 145b positioned opposite the first resonator on a second side of the signal conductor. In some embodiments resonators 145 may not be arranged in pairs and may be positioned periodically along only one side of signal conductor 120.

Each resonator of the resonator pairs 145a, 145b includes one or more capacitive structures and one or more inductive structures that define a bandgap within an operating bandwidth of the waveguide, as described in more detail below. Control can be exerted over which qubits communicate with each other by changing a center frequency of a communication band of the qubits. More specifically, qubits can be communicatively coupled to each other at frequencies both within the bandgap and on either side of the bandgap within an operating bandwidth of the waveguide.

Within the bandgap, only qubits that are within a predetermined proximity of each other can communicate. Outside the bandgap essentially all qubits communicate, or at least qubits within a much larger proximity of each other can communicate. Further, only qubits that operate at the same center frequency can communicate such that if the qubits are operating at a different center frequencies no qubit "coupling" occurs via the waveguide. Thus, the center frequency of the qubit communication band can be used to control the communicative coupling of qubits that are coupled to the metamaterial waveguide.

As illustrated in FIG. 1, qubits 105a . . . 105d are intentionally arranged to have different communication distances between them where the communication distance is a distance that a signal must travel along signal conductor 120 to reach another qubit. Thus, the communication distance between two qubits may be different from a physical distance between the two qubits if the metamaterial waveguide does not extend in a direct straight line path between the two qubits. Therefore, qubits that are in close physical proximity of each other may have a communications distance that is many times their physical distance by arranging the metamaterial waveguide in, for example, a serpentine pattern.

For the purposes of illustration, communication distances for representative qubits and groups of qubits are shown in FIG. 1 by lines 170, 175 and 180. As appreciated by a person of skill in the art, FIG. 1 and the distances shown herein are for conceptual illustration only and this disclosure shall not be limited to this example. Further, in this example it is assumed that all qubits operate at the same center frequency, however in other embodiments, as described above, further control can be exerted over which qubits are communicatively coupled by selectively isolating certain qubits by changing their center frequency.

Qubits 105a . . . 105d are arranged with different communication distances to illustrate how communications between the qubits can be controlled. For simplicity of illustration, qubit 105a shall be used as a representative basis for determining the different communications distances in quantum circuit 100. Following, qubit 105a is within a communications distance 170 of qubit 105b, illustrated as 0.25 millimeters, for example. Qubit 105a is within a communications distance 175 of qubit 105c, illustrated as 0.5 millimeters, for example. Qubit 105a is within a communications distance 180 of qubit 105d, illustrated as 2.0 millimeters, for example.

Figure 2:
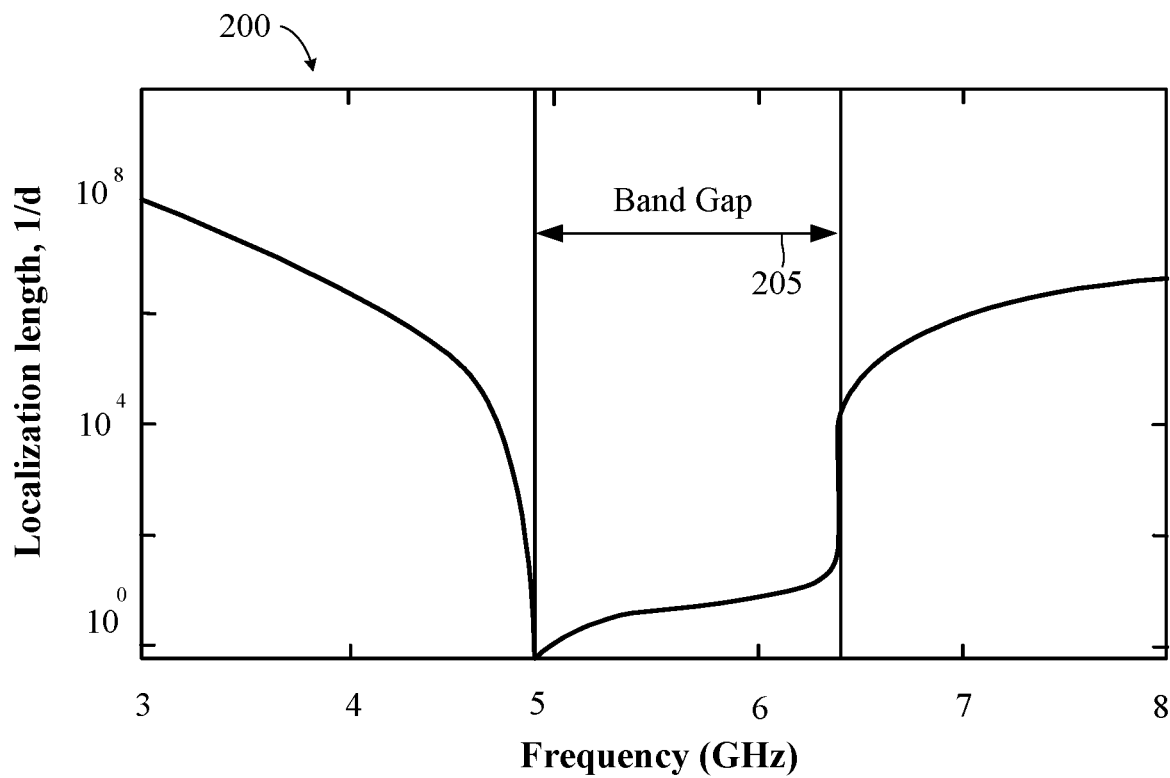
FIG. 2 is an example localization length versus frequency graph for the circuit illustrated in FIG. 1.

FIG. 2 is an example, versus frequency graph 200 for waveguides 110a . . . 110d (see FIG. 1), where l is the localization length and d is the unit cell spacing. For purposes of simplicity, localization length, as discussed herein, shall be referred to as indicative of a distance over which qubits can communicate (i.e., communications distance). As illustrated in FIG. 2, a bandgap 205 is defined within an operating bandwidth of waveguides 110a . . . 110d (see FIG. 1), where the bandgap extends from approximately 5 GHz to 6.4 GHz. Within bandgap 205, the communications distance is substantially less than outside of the bandgap and predictably and steadily increases as the frequency is increased from 5 GHz to 6.4 GHz. On either side of bandgap 205, the communications distance significantly increases.

Using a unit cell spacing of approximately 350 microns, for example, as the frequency within the bandgap is increases, from 5 GHz to 6.4 GHz the distance over which qubits can communicate (i.e., communications distance)

increases from approximately 0.5 millimeters to approximately 10 millimeters. Increasing the frequency to 7 GHz, pushes the communications frequency outside bandgap 205 and the communications distance increases to approximately 350 meters, such that effectively all qubits coupled to the communications bus (and that are operating at the same center frequency) can communicate. Using a localization length versus frequency graph, such as for example localization length versus frequency graph 200, for different qubit communications band center frequencies, a signal strength versus distance graph can be generated that illustrates a maximum communications distance between qubits.

Figure 3:
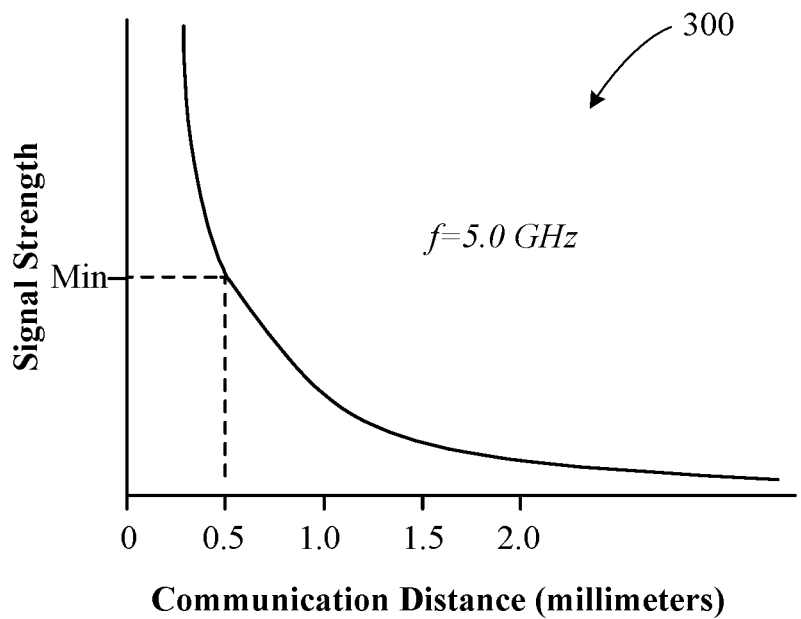
FIG. 3 is an example signal strength versus communications distance graph for the qubits illustrated in FIG. 1 when communicating at a center frequency of 5.0 GHz.

FIG. 3 is an example signal strength versus communications distance graph 300 for qubits communicating at a center frequency of 5.0 GHz. Signal strength versus communications distance graph 300 is for conceptual purposes only and shows that a minimum signal strength required for two qubits to communicate at a center frequency of 5.0 GHz is achieved at a communications distance of 0.5 millimeters or less. Therefore, if two qubits have a communications distance greater than 0.5 millimeters, although they are coupled to the same waveguide, they will not be able to communicate.

Figure 4:
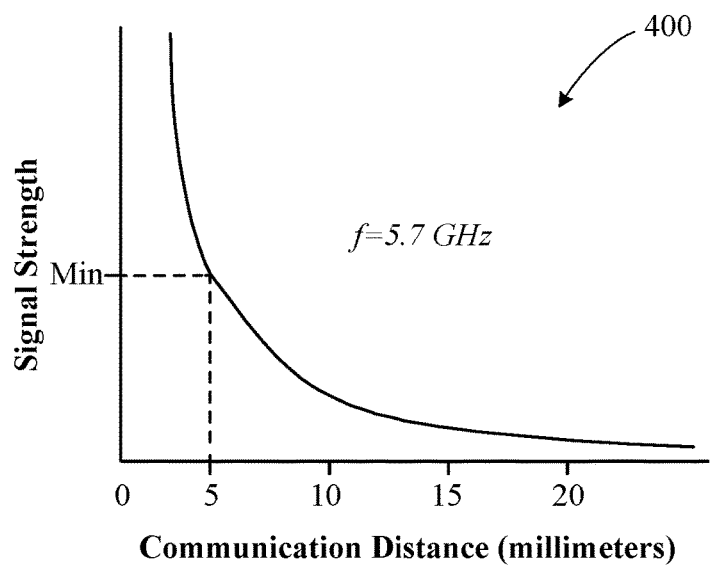
FIG. 4 is an example signal strength versus communications distance graph for the qubits illustrated in FIG. 1 when communicating at a center frequency of 5.7 GHz.

FIG. 4 is an example signal strength versus communications distance graph 400 for qubits communicating at a center frequency of 5.7 GHz. In this graph the center frequency for the qubit communications band has been increased from 5.0 GHz to 5.7 GHz and as a result the minimum signal strength required for two qubits to communicate is achieved at a communications distance of 5.0 millimeters or less. Therefore, by increasing the center frequency of the qubit communication band by 0.7 GHz, the maximum communications distance increased from 0.5 millimeters to 5.0 millimeters, extending the communications distance by an order of magnitude.

Now referring back to FIG. 1 and using the graphs in FIGS. 3 and 4 as example communications distance curves for waveguides 110a . . . 110d, the effect of the change in center frequency from 5.0 GHz to 5.7 GHz for the qubit communications band can be examined. If the center frequency of the qubit communication band is set to 5.0 GHz (see FIG. 3) then qubits 105a and 105b can communicate with each other, and qubits 105a and 105c can communicate with each other. However, qubits 105a and 105d cannot communicate with each other because they have a communications distance that is greater than 0.5 millimeters.

However, by shifting the center frequency of the qubit communications band to 5.7 GHz (see FIG. 4) then all the qubits that communicated at 5.0 GHz can communicate, and in addition, now qubits 105a can communicate with qubit 105d. Therefore, bandgap 205 (see FIG. 2) created by metamaterial waveguides 110a . . . 110d enables selective qubit communications which is controlled by changing a center frequency of the qubit communications band. The architecture described above can also apply to coplanar waveguide and qubit interactions, as described in further detail below.

Figure 5:
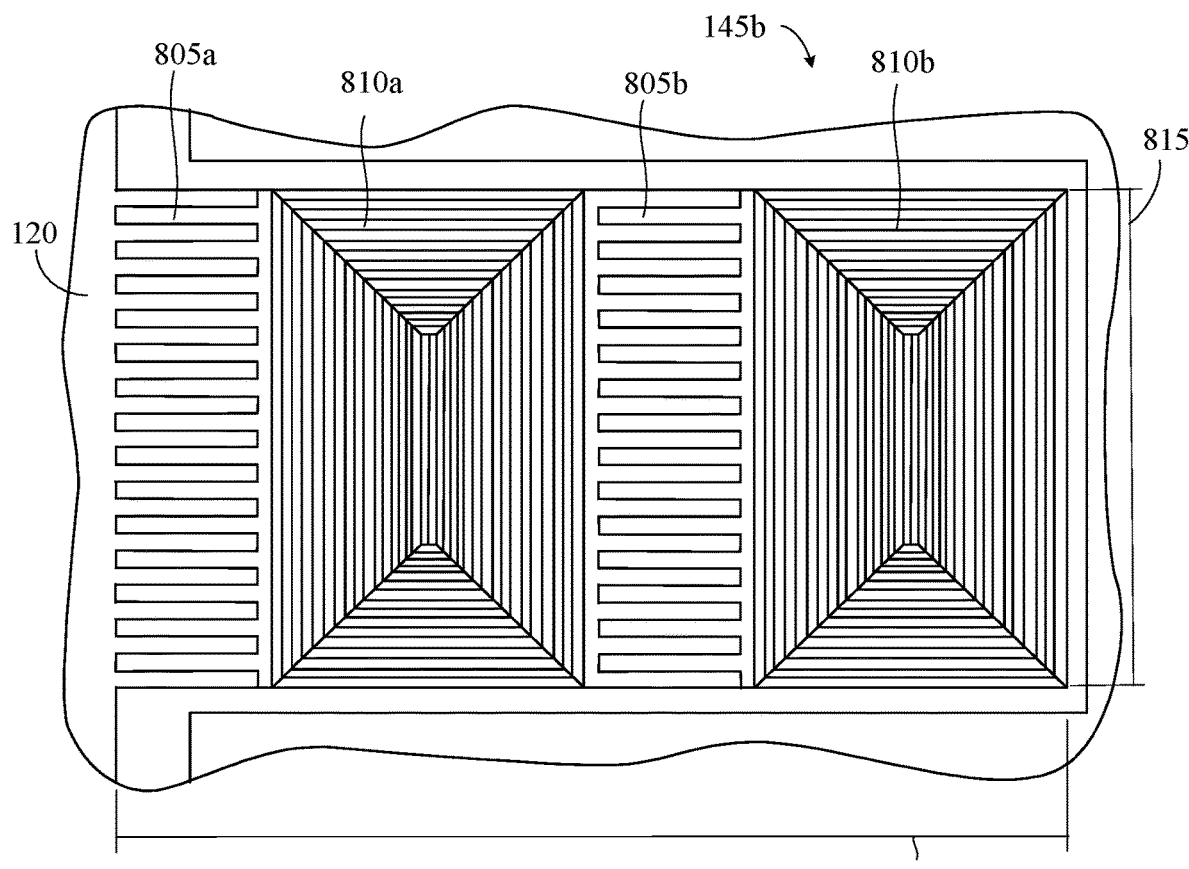
FIG. 5 illustrates a simplified magnified view of the metamaterial waveguide resonator shown in FIG. 1.

FIG. 5 illustrates a magnified view of a metamaterial waveguide resonator 145b shown in FIG. 1. Resonator 145b is representative of both resonators 145a and 145b illustrated in FIG. 1. Resonator 145b is capacitively coupled to longitudinal signal conductor 120 with a first interdigital capacitor 805a. Resonator 145b further includes first and second double spirals 810a, 810b and second interdigital capacitor 805b. Resonator 145a has a width 815 and a length 820 that are less than a wavelength of the center frequency of the qubit communications band, therefore, waveguides 110a . . . 110d (see FIG. 1) can be referred to as a metamaterial waveguides because the resonator dimensions are smaller than a wavelength of the signal.

More specifically, in one embodiment, resonator 145a has a width 815 that is 50 microns and a length 820 that is 100 microns. In comparison, the shortest wavelength within waveguide bandgap (see FIG. 2) is at approximately 6.5 GHz corresponding to a wavelength of approximately 46 millimeters, which is 460 times the 100 micron length of the resonator. In some embodiments the wavelength can be between 2 times and 1000 times the resonator dimensions, while in various embodiments the wavelength can be between 100 times and 800 times the resonator dimensions and in one embodiment the wavelength can be greater than 100 times the resonator dimensions.

One of skill in the art will appreciate that the geometries and center frequencies described above are for example only and that other designs, configurations, geometries, etc. can be employed without departing from this disclosure. One of skill in the art will further appreciate that a lumped element resonator is not limited to the configuration shown in FIG. 5 and that any suitable combination and connection of inductive structures and capacitive structures can be employed without departing from this disclosure.

In some embodiments resonator 145a is formed from aluminum that is deposited on an insulating substrate such as silicon. However, one of skill in the art will appreciate that any suitable insulator will work for the substrate and that any suitable conductive material can substituted for the aluminum. In one particular embodiment the aluminum can be deposited with an electron beam evaporator and have a thickness of approximately 120 nanometers.

In some embodiments a low disorder waveguide may be formed by using an appropriate thickness of conductor metal, using a deposition technique with suitable accuracy and by designing the resonators to minimize and consistently control stray inductance and stray capacitance. More specifically, in such embodiments, the deposited aluminum may have a minimum thickness of 60 nanometers, and in some embodiments can have a thickness between 60 and 400 nanometers, while in further embodiments the conductor thickness may be greater than 60 nanometers.

An appropriate thickness from the aforementioned ranges may be selected to minimize the effect of kinetic inductance on disorder. Stray inductance and capacitance can be minimized and controlled by containing the electric and magnetic fields to the area in the vicinity of the resonators which can be accomplished by making the resonators symmetric, and by maximally surrounding each resonator by a ground plane.

Figure 6:
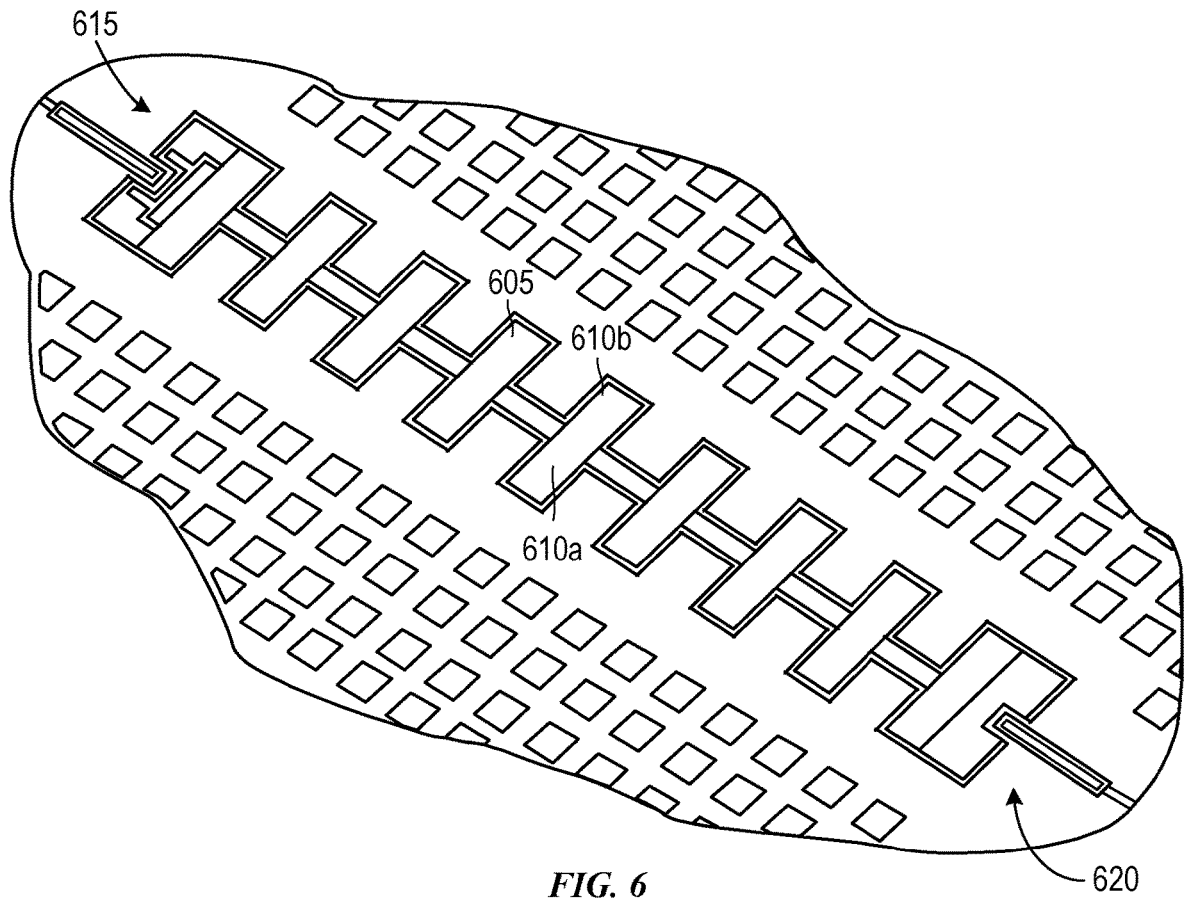
FIG. 6 illustrates a metamaterial waveguide coupling a coplanar wave guide to a superconducting qubit, according to an embodiment of the present invention.

FIG. 6 illustrates a metamaterial waveguide coupling a coplanar wave guide to a superconducting qubit according to another embodiment of the present invention. As shown in FIG. 6, metamaterial waveguide 605 includes resonator pairs 610a, 610b that are used to mimic the behavior of lumped elements. A coplanar waveguide 615 is coupled to one end of metamaterial waveguide 605, and a superconducting qubit 620 is coupled to an opposite end of the metamaterial waveguide. In this embodiment, resonator pairs 610a, 610b operate in the frequency range of 6-10 GHz, however in other embodiments a different frequency range can be used.

The embodiment illustrated in FIG. 6 provides compact resonator pairs by placing interdigital capacitors at the anti-nodes of the charge waves and double spiral coils near the peak of the current waves at the fundamental frequency. Further, the symmetry of the geometry results in the suppression of a second harmonic frequency and thus the elimination of a bandgap at twice the fundamental resonance frequency of the band-gap waveguide.

In the embodiment illustrated in FIG. 6, a transmon qubit 620 is used with a fundamental resonance frequency vge=7.9 GHz and Josephson energy to single electron charging energy ratio of EJ/EC≈100 at zero flux bias. Qubit 620 is capacitively coupled to one end of metamaterial waveguide 605 and the other end is capacitively coupled to a 50 ohm coplanar waveguide (CPW) 615 transmission line. This geometry allows for forming narrow individual modes in the transmission band of the metamaterial, which can be used for dispersive qubit state read-out from reflection measurements at the 50 ohm CPW input port.

Within the bandgap the qubit is self-dressed by virtual photons which are emitted and re-absorbed due to the lack of escape channels for the radiation. Near the band-edges surrounding the bandgap, where the local density of states (LDOS) is rapidly varying with frequency, this can result in a large Lamb shift of the dressed qubit frequency.

Transmon qubit 620 is capacitively coupled to the resonator at the end of the array. A Z drive is used to tune the qubit resonance frequency by controlling the external flux bias in the superconducting quantum interference device (SQUID) loop. An XY drive is used to coherently excite qubit 620. Qubit 620 frequency is tuned using a flux bias and the frequency shift is found by subtracting the measured frequency from the expected frequency of the qubit as a function of flux bias.

In this embodiment, individual resonator pairs 610a, 610b were fabricated using an electron-beam deposited 120 nm Al film, patterned via lift-off, on a high resistivity silicon wafer substrate of thickness 500 microns. In this particular embodiment a periodic array of nine resonator pairs is used with a wire width of 1 micron and coupled to a CPW in a periodic fashion with a lattice constant of 350 microns to realize a metamaterial waveguide. The resonators are arranged in identical pairs placed on the opposite sides across the central waveguide conductor to preserve the symmetry of the waveguide.

Figure 7:
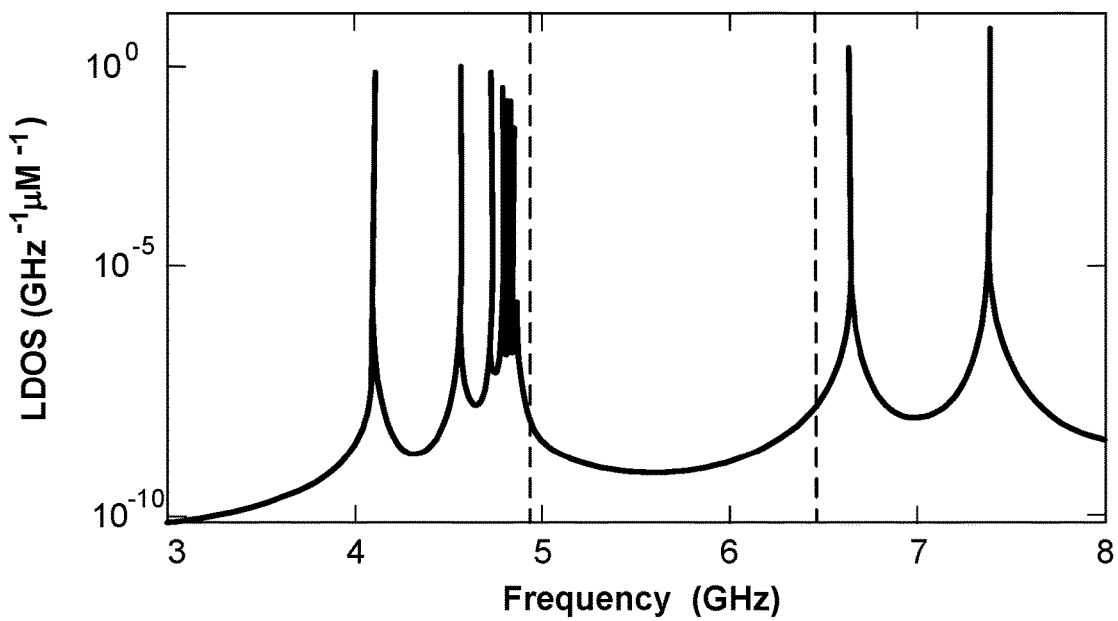
FIG. 7 illustrates a calculated local density of states (LDOS) at the qubit position for the metamaterial waveguide illustrated in FIG. 6.

FIG. 7 shows a calculated local density of states (LDOS) graph at the qubit position for a metamaterial waveguide with a length of nine unit cells and open boundary conditions. The band-edges for an infinite structure are marked with dashed lines. Near the edges of the bandgap the localization length from disorder dominates that from loss, rapidly approaching zero at the lower band-edge where the group index is largest and maintaining a large value ($6 \times 10^3$ periods) at the higher band-edge where the group index is smaller.

Similarly, the localization length inside the gap is inversely proportional to the curvature of the energy bands. Owing to the divergence (in the loss-less case) of the lower band curvature for the waveguide in this embodiment, the localization length inside the gap approaches zero near the lower band-edge frequency as well. These results indicate that, even with practical limitations on disorder and loss in such metamaterial waveguides, a range of photon length scales of nearly four orders of magnitude can be accessible for frequencies within a few hundred MHz of the band-edges.

Figure 8:
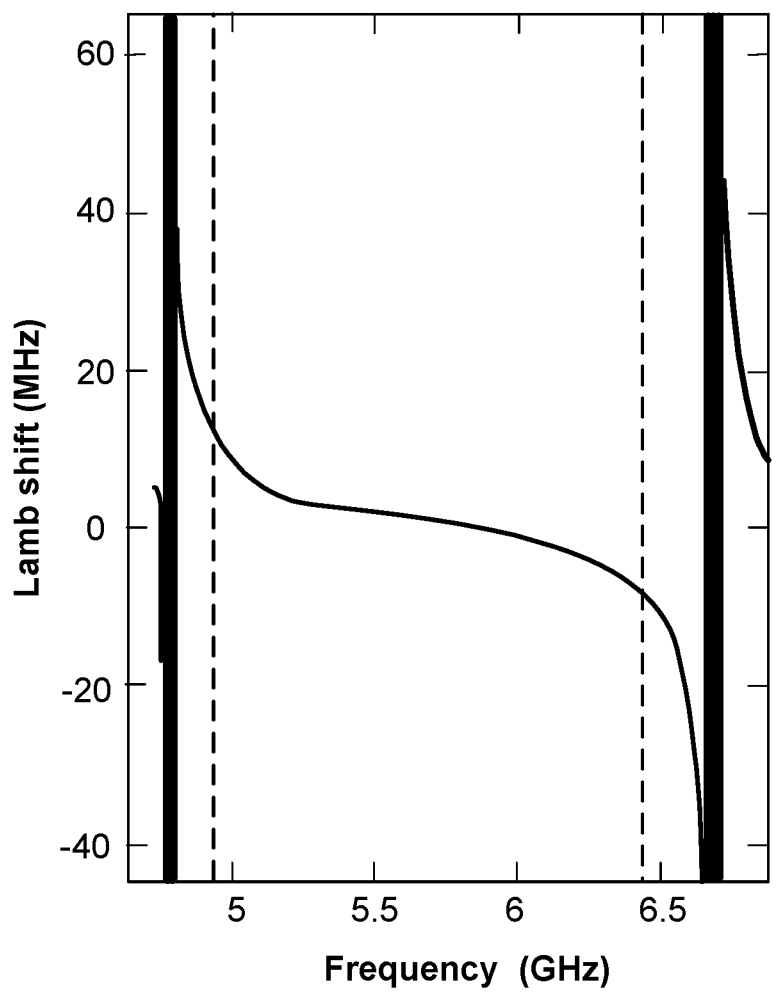
FIG. 8 illustrates a graph of a theoretical fit to measured frequency shift as a function of tuning, according to an embodiment of the present invention.

FIG. 8 shows the measured frequency shift as a function of tuning. It is evident that the qubit frequency is repelled from the band-edges on the two sides, as a result of the asymmetric density of states near the cut-off frequencies. The measured frequency shift is approximately 10 MHz at the band-edges (0.2% of the qubit frequency).

Another signature of the qubit-waveguide interaction is the change in the rate of spontaneous emission of the qubit. Tuning the qubit into the bandgap changes the localization length of the waveguide photonic state that dresses the qubit. Since the finite waveguide is connected to an external port which acts as a dissipative environment, the change in localization length $l(\omega)$ is accompanied by a change in the radiative lifetime of the qubit $T_{rad}(\omega) \propto e^{2x/l(\omega)}$, where x is the total length of the waveguide.

Figure 9:
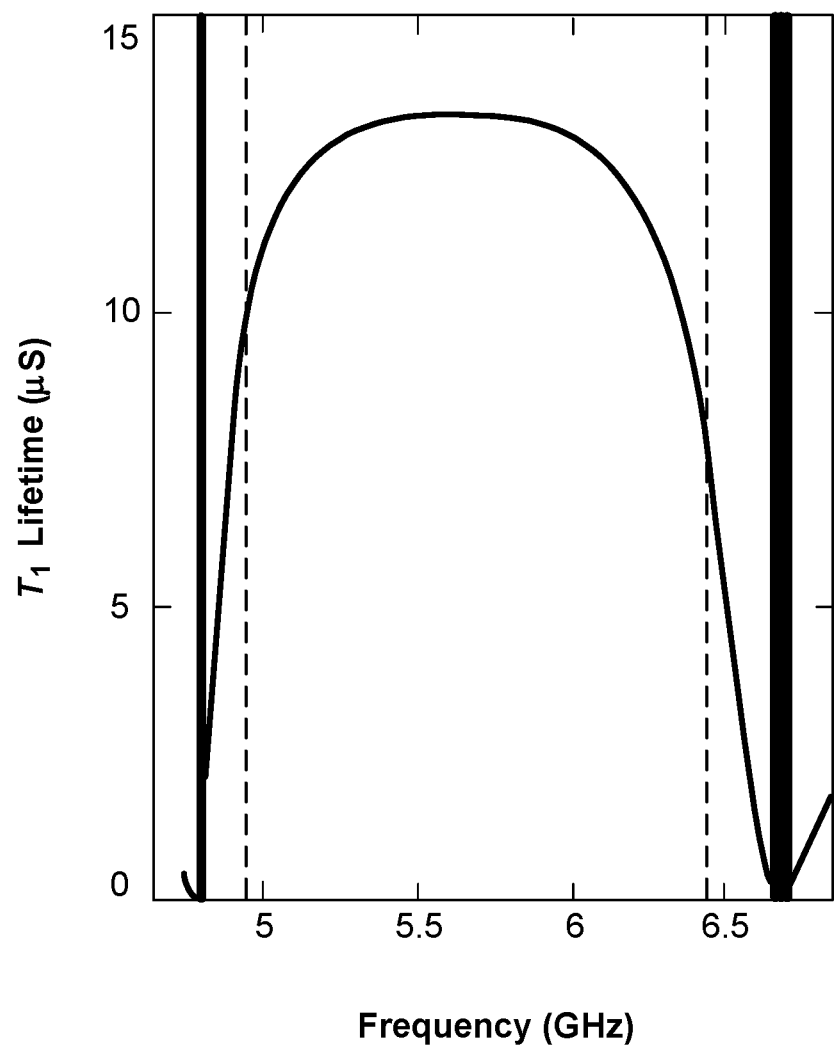
FIG. 9 illustrates a graph of a theoretical fit to qubit lifetime as a function of its frequency in a bandgap, according to an embodiment of the present invention.

FIG. 9 shows the measured qubit lifetime (Ti) as a function of its frequency in the bandgap. It is evident that the qubit lifetime drastically increases inside the bandgap, where spontaneous emission into the output port is greatly suppressed due to the reduced localization length of the photon bound state. These features, attributable to parasitic "box" modes of the chip packaging, highlight the ability of the metamaterial waveguide to enable effectively-dissipation-free probing of the qubit's environment over a broad spectral range (>1 GHz).

As the qubit frequency approaches the band-edges, the lifetime is sharply reduced because of the increase in the localization length of the waveguide modes. The slope of the life time curve at the band-edge can be shown to be directly proportional to the group delay, $|\partial T_{rad}/\partial \omega| = T_{rad}\tau_{delay}$. In this embodiment a 24-fold enhancement in the lifetime of the qubit can be observed near the upper band-edge, corresponding to a maximum group index of ng=450 right at the band-edge.

In addition to radiative decay into the output channel, losses in the resonators in the waveguide also contribute to the qubit's excited state decay. Using a low power probe in the single-photon regime intrinsic Q-factors of $(7.2 \pm 0.4) \times 10^4$ for the individual waveguide modes between 4.6-7.4 GHz were measured. The solid line in FIG. 9 shows a fitted theoretical curve which takes into account the loss in the waveguide along with a phenomenological intrinsic lifetime of the qubit.

While the measured lifetime near the upper band is in excellent agreement with a theoretical model, the data near the lower band exhibits a departure from the model. The departure in the lower band may be attributed to the presence of a spurious resonance or resonances near the lower band-edge. Possible candidates for such spurious modes include the asymmetric "slotline" modes of the metamaterial waveguide, which are weakly coupled to the symmetrically grounded CPW line but may couple to the qubit. Further study of the spectrum of these modes and possible methods for suppressing them using cross-over connections may be a topic of future studies.

The sharp variation in the photonic LDOS near the metamaterial waveguide band-edges may also be used to engineer the multi-level dynamics of the qubit. A transmon qubit, by construct, is a nonlinear quantum oscillator and thus it has a multilevel energy spectrum. In particular, a third energy level (lf) exists at the frequency $\omega_{gf}=2\omega_{ge}-E_C/\hbar$. Although the transition g-f is not allowed because of the selection rules, the f-e transition is allowed and has a dipole moment that is $\sqrt{2}$ larger than the fundamental transition. This is reminiscent of the scaling of transition amplitudes in a harmonic oscillator and results in a second transition lifetime that is half of the fundamental transition lifetime for a uniform density of states in the electromagnetic bath. Nonetheless, the sharply varying density of states in the metamaterial can lead to strong suppression or enhancement of the spontaneous emission for each transition.

Figure 10:
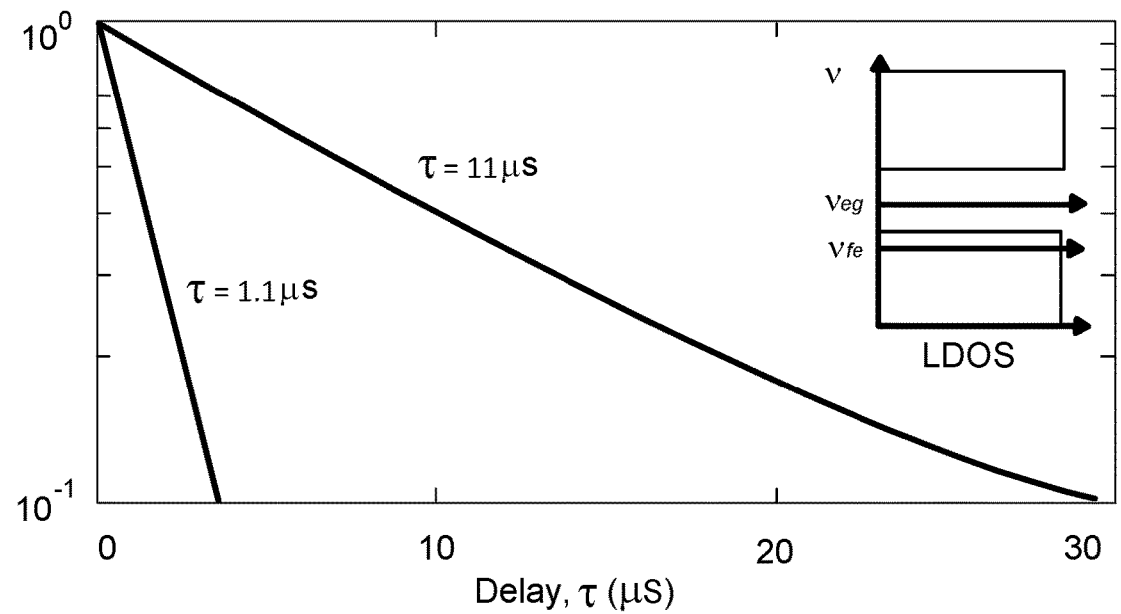
FIGS. 10 and 11 illustrate a graph of a theoretical fit to measured excited state probabilities of the two transitions for two different spectral configurations, from which lifetimes can be extracted, according to an embodiment of the present invention.
Figure 11:
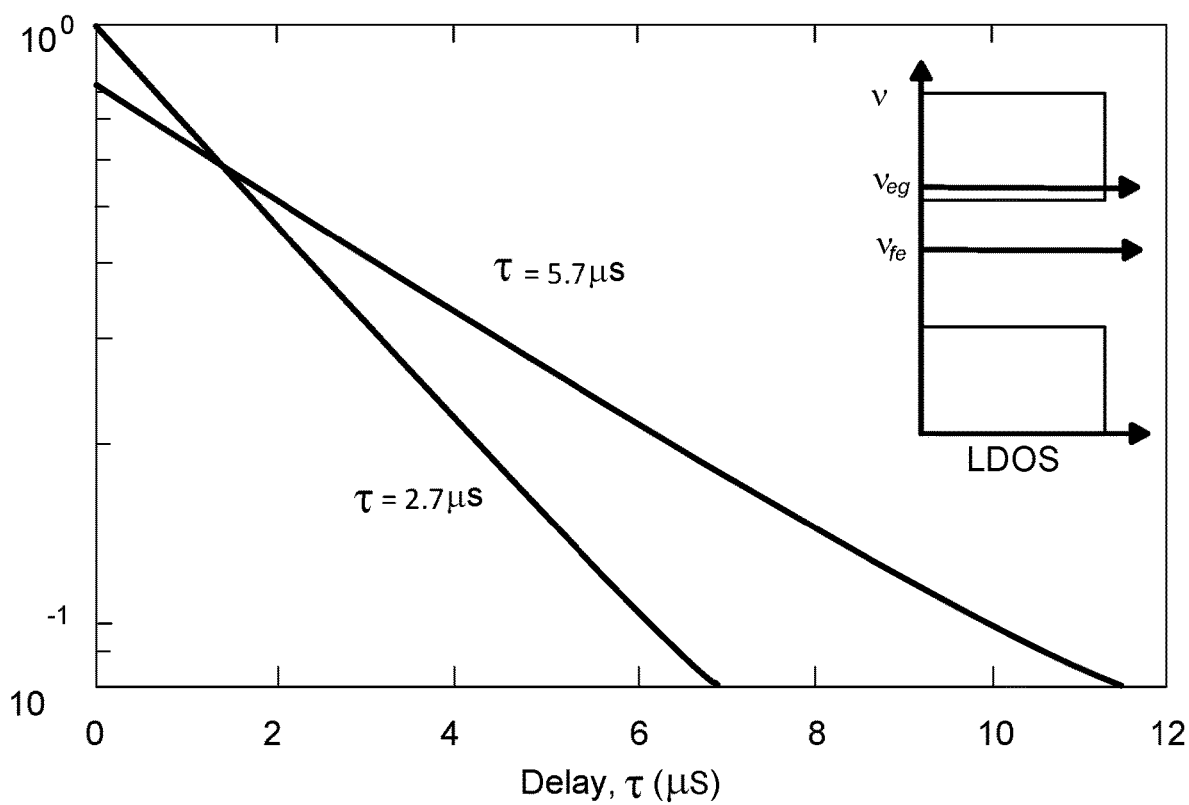

FIGS. 10 and 11 show the measured lifetimes of the two transitions for two different spectral configurations. In FIG.

10, the ratio of the lifetimes Teg/Tfe is enhanced by situating the fundamental transition frequency inside in the bandgap while having the second transition positioned inside the lower transmission band. The situation is reversed in FIG. 11, where the fundamental frequency is tuned to be within the upper energy band while the second transition lies inside the gap. In the fabricated qubit, the second transition is 290 MHz lower than the fundamental transition frequency at zero flux bias, which allows for achieving large lifetime contrast in both configurations.

Compact, low loss, low disorder superconducting metamaterials, as disclosed herein, can help realize more scalable superconducting quantum circuits with higher levels of complexity and functionality in several regards. They offer a method for densely packing qubits, both in spatial and frequency dimensions, with isolation from the environment by operation in forbidden bandgaps, and yet with controllable connectivity achieved via bound qubit waveguide polaritons.

Moreover, the ability to selectively modify the transition lifetimes provides simultaneous access to long-lived metastable qubit states as well as short-lived states strongly coupled to waveguide modes. This approach realizes an effective structure for the transmon, and can be used to create state-dependent bound state localization lengths, quantum nonlinear media for propagating microwave photons, or as recently demonstrated, to realize spin-photon entanglement and high-bandwidth itinerant single microwave photon detection. Combined, these attributes provide a unique platform for studying the many-body physics of quantum photonic matter.

Shielded Bridges

Figure 12:
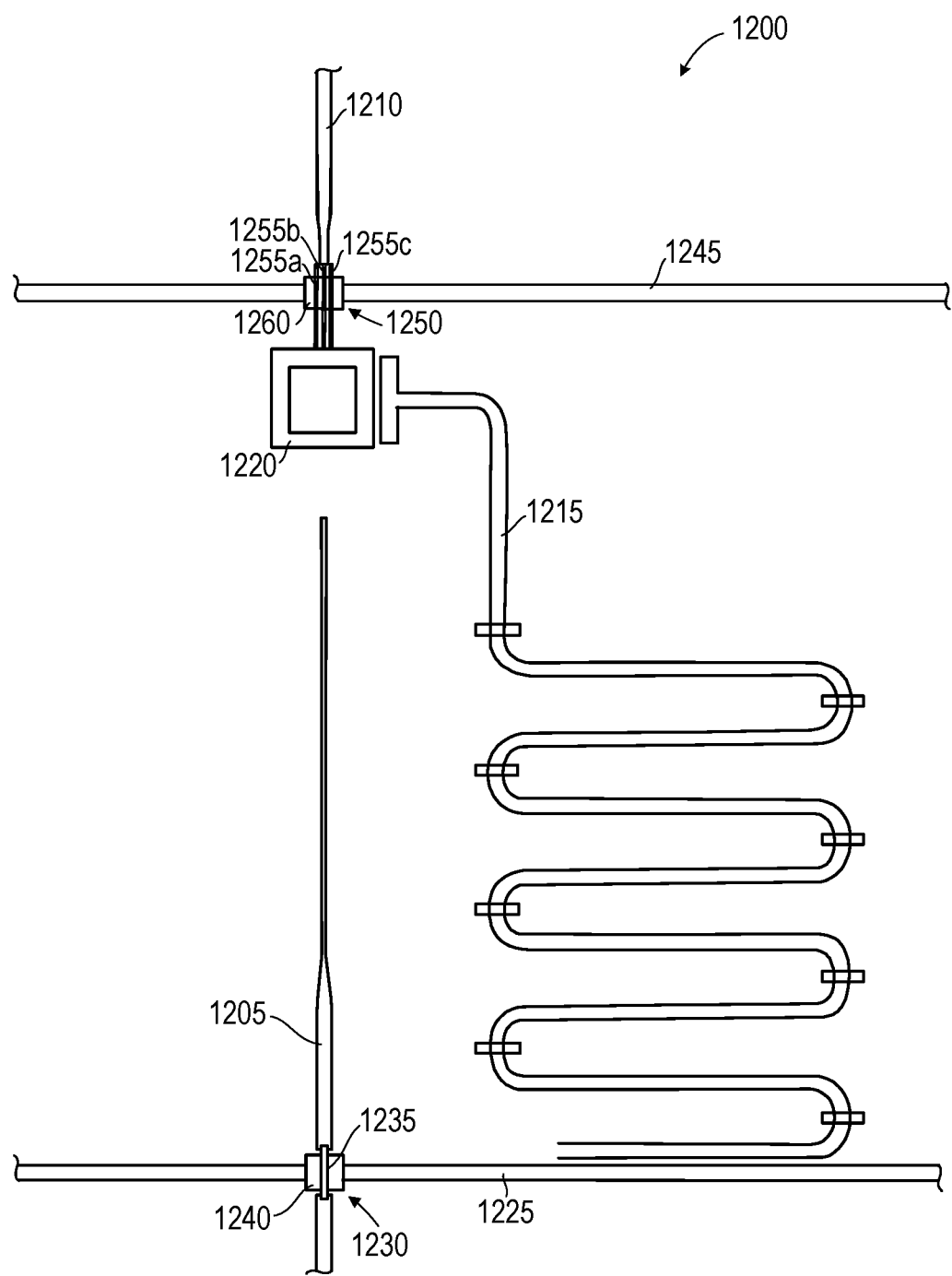
FIG. 12 is a simplified qubit circuit that includes shielded bridges, according to an embodiment of the present invention.

FIG. 12 is a simplified qubit circuit 1200 that includes shielded bridges that may be similar to shielded bridges 115 illustrated in FIG. 1. As illustrated in FIG. 12, qubit circuit 1200 includes an XY drive line 1205, a flux bias line (Z control) 1210 and a readout resonator 1215 for qubit 1220. XY drive line 1205 crosses a first transmission line 1225 using a shielded bridge 1230 that includes a signal bridge 1235 and a ground bridge 1240. Signal bridge 1235 is elevated and extends over first transmission line 1225, with ground bridge 1240 positioned between signal bridge 1235 and first transmission line 1225. In some embodiments ground bridge 1240 functions both as a shield to minimize crosstalk between the two crossing signals and as a ground path for signal bridge 1235 to maintain impedance as the signal crosses over first transmission line 1225.

In some embodiments more than one signal bridge can extend over a single ground bridge. For example, flux bias line 1210 crosses a second transmission line 1245 using a shielded bridge 1250 that is similar to shielded bridge 1230, but shielded bridge 1250 includes 3 signal bridges 1255a, 1255b, 1255c over a single ground bridge 1260. A person of skill in the art will appreciate that, in other embodiments, any number of signal bridges can extend over a single ground bridge.

Figure 13:
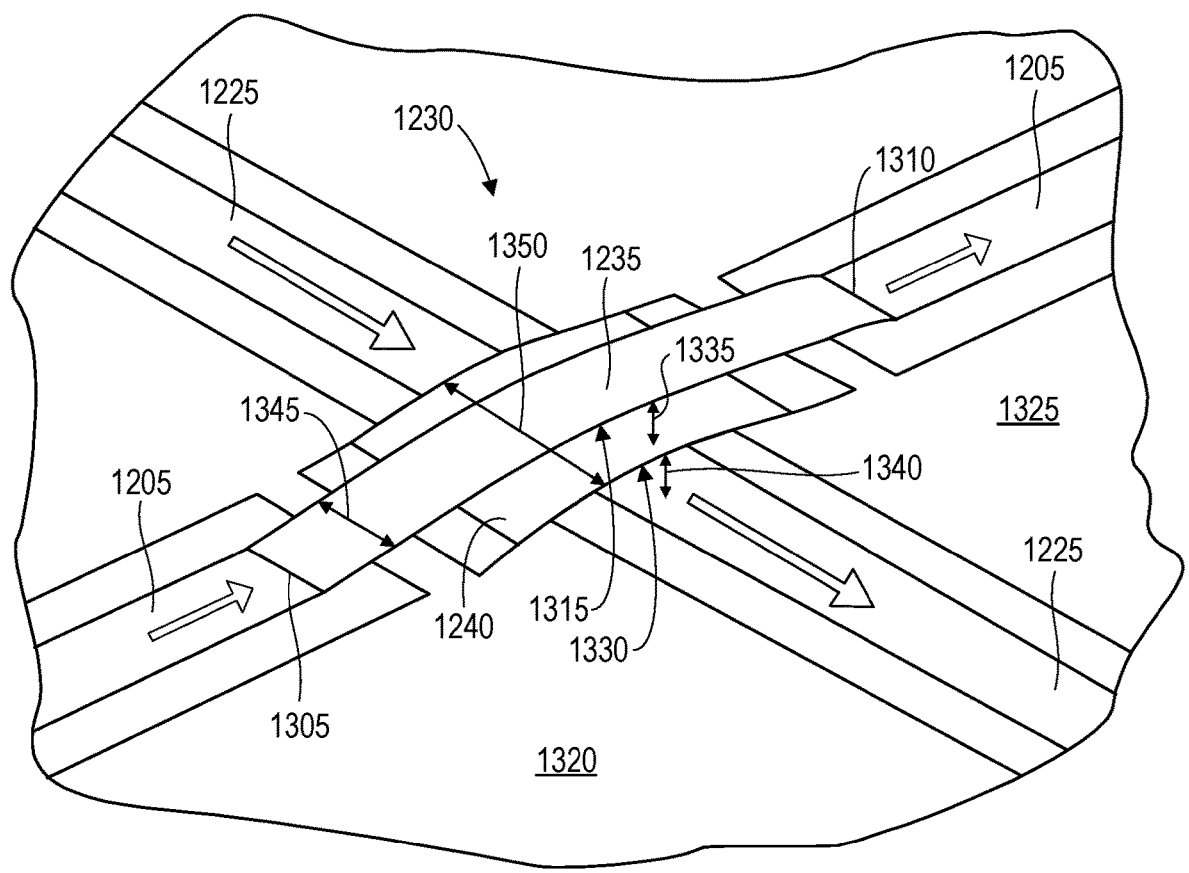
FIG. 13 is a magnified isometric view of one of the shielded bridges illustrated in FIG. 12.

FIG. 13 is a magnified isometric view of shielded bridge 1230 illustrated in FIG. 12. As shown in FIG. 13, shielded bridge 1230 includes a signal bridge 1235 and a ground bridge 1240 that enable XY drive line 1205 to cross over first transmission line 1225 with reduced crosstalk between the two lines. More specifically, signal bridge 1235 extends from a first terminal 1305 of XY drive line 1205 to a second terminal 1310 of the XY drive line and conducts electromagnetic energy associated with the XY drive line across first transmission line 1225. Signal bridge 1235 includes a raised central portion 1315 positioned between first terminal 1305 and second terminal 1310.

Ground bridge 1240 extends from a first ground plane 1320 on a first side of first transmission line 1225 to a second ground plane 1325 on a second side of the first transmission line such that the ground bridge is positioned between signal bridge 1235 and first transmission line 1225. Ground bridge 1240 includes a raised middle portion 1330 positioned between first ground plane 1320 and second ground plane 1325.

A first gap 1335 is defined between signal bridge 1235 and ground bridge 1240 and a second gap 1340 is defined between ground bridge 1240 and the first transmission line 1225. First and second gaps 1335, 1340, respectively, can be used to ensure that shorting does not occur between signal bridge 1235, ground bridge 1240 and first transmission line 1225. In some embodiments first and second gaps 1335, 1340, respectively, are filled with air while in other embodiments the gaps are void and a vacuum is formed therein. In yet further embodiments a dielectric material can be used to fill the first and/or the second gaps.

Signal bridge 1235 has a width 1345 and ground bridge 1240 has a width 1350. In some embodiments width 1345 of signal bridge 1235 is less than width 1350 of ground bridge 1260, as illustrated in FIG. 13, however in other embodiments the relative widths may be different. In some embodiments signal bridge 1235 and ground bridge 1240 can change widths, thickness or any other geometry to improve the impedance match of shielded bridge 1230 and/or crosstalk isolation from first transmission line 1225.

For example, width 1345 of signal bridge 1235 and/or width 1350 of ground bridge 1240 may not be uniform as shown and may vary as they extend across first transmission line 1225. One of skill in the art will appreciate that any number of physical parameters can be changed to improve the impedance match and crosstalk isolation characteristics of shielded bridge 1230. In some embodiments, a width 1345 of signal bridge 1235 is approximately 10 microns and a width 1350 of ground bridge 1240 is approximately 33 microns.

In further embodiments, one of skill in the art will appreciate that any number of transition structures can be used to improve the matched impedance characteristics of shielded bridge 1230 and/or first transmission line 1225.

Figure 14:
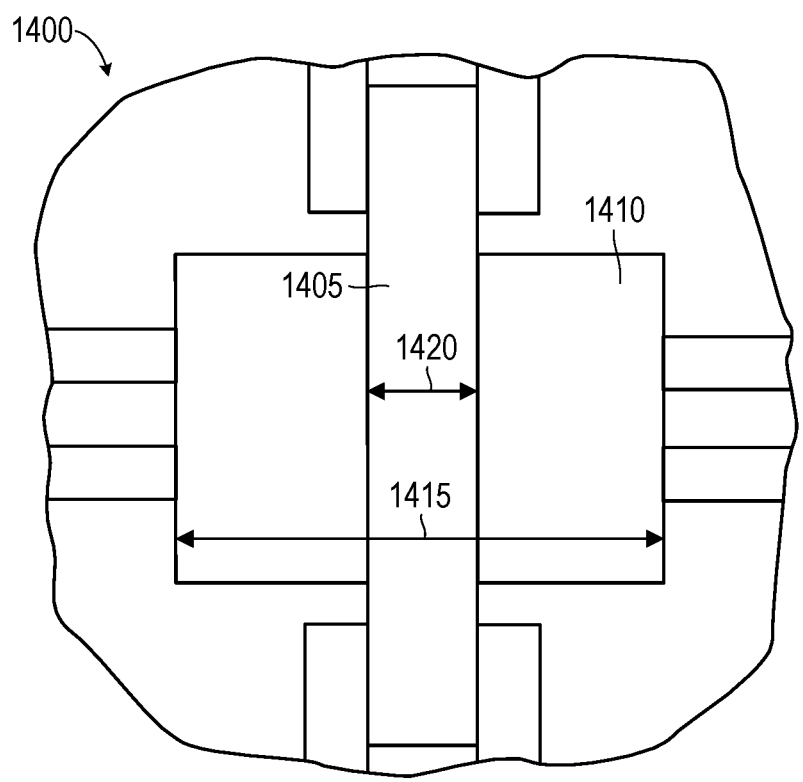
FIG. 14 is a plan view of a shielded bridge having a ground bridge of increased width as compared to a signal bridge, according to an embodiment of the present invention.

FIG. 14 is a plan view of a shielded bridge 1400 having a ground bridge of increased width, as compared to shielded bridge 1230 illustrated in FIG. 13. As illustrated in FIG. 14, shielded bridge 1400 includes a signal bridge 1405 disposed above a ground bridge 1410. In this embodiment a width 1415 of ground bridge 1410 is greater than 3 times a width 1420 of signal bridge 1405. In some embodiments a width 1415 of ground bridge 1410 is approximately 44 microns and a width 1420 of signal bridge 1405 is approximately 10 microns.

Figure 15:
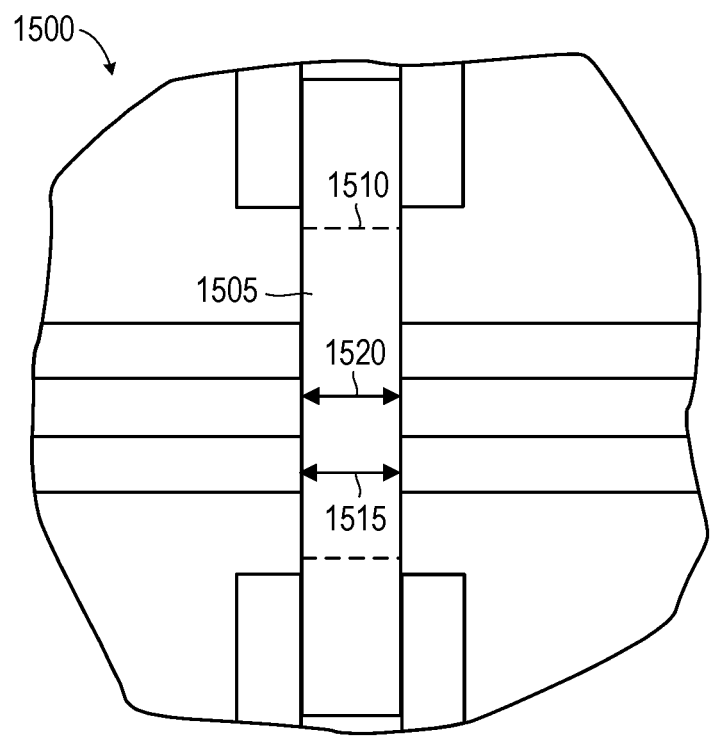
FIG. 15 is a plan view of a shielded bridge having a ground bridge of a similar width as compared to a signal bridge, according to an embodiment of the present invention.

FIG. 15 is a plan view of a shielded bridge 1500 having a ground bridge of a similar width as a signal bridge, as compared to shielded bridge 1230 illustrated in FIG. 13. As illustrated in FIG. 15, shielded bridge 1500 includes a signal bridge 1505 disposed above a ground bridge 1510. In this embodiment a width 1515 of ground bridge 1510 is the same width as a width 1520 of signal bridge 1505. In some embodiments a width 1515 of ground bridge 1510 is approximately 11 microns and a width 1520 of signal bridge 1505 is approximately 10 microns.

Figure 16:
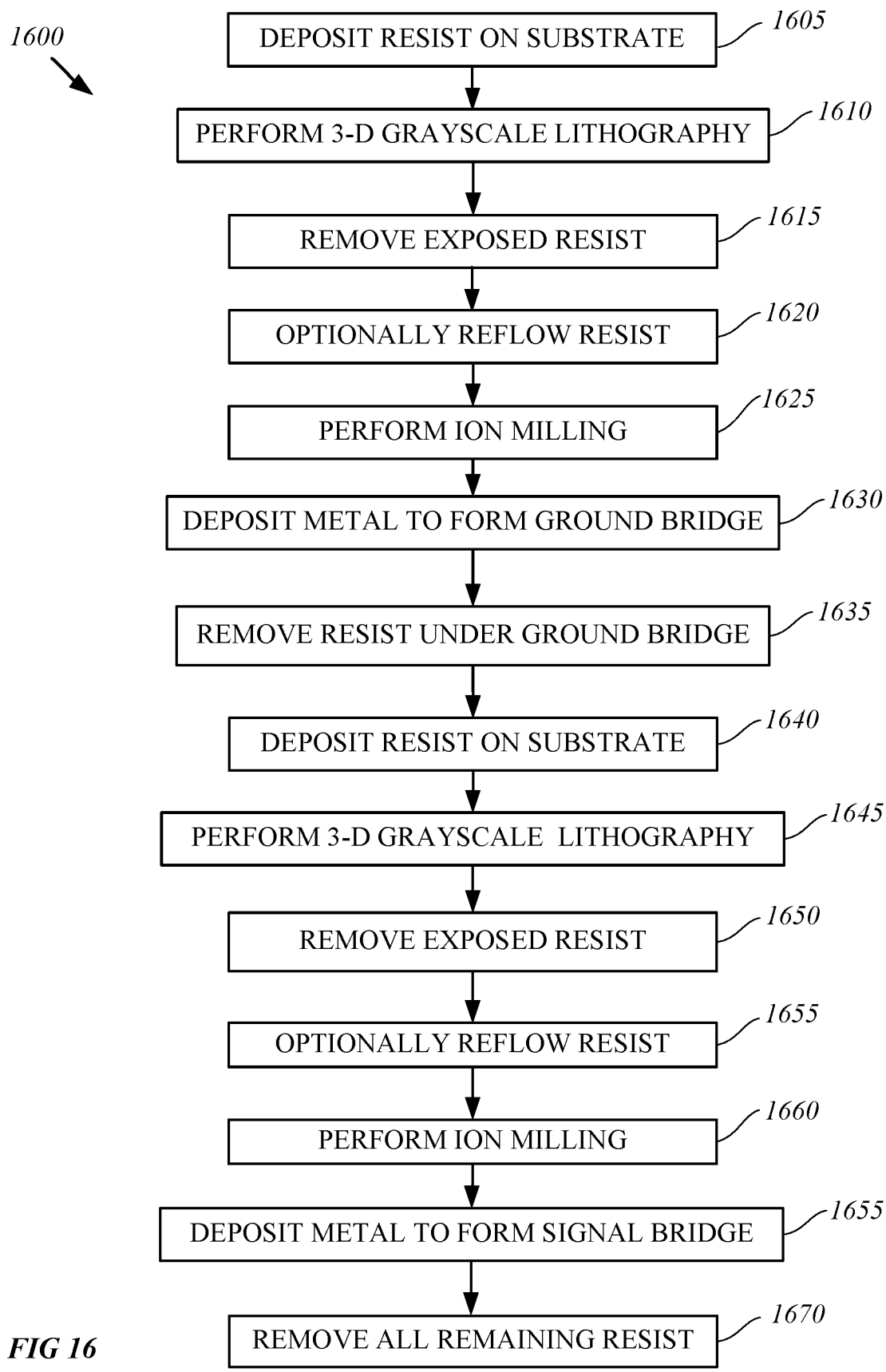
FIG. 16 illustrates steps associated with a method of forming a shielded bridge, according embodiments of the disclosure.

FIG. 16 illustrates steps associated with a method 1600 of forming a shielded bridge according embodiments of the disclosure. FIGS. 17-22 illustrate simplified cross-sectional views of the formation of a shielded bridge according to method 1600 described in FIG. 16. FIGS. 16-22 will be referred to simultaneously below.

Figure 17:
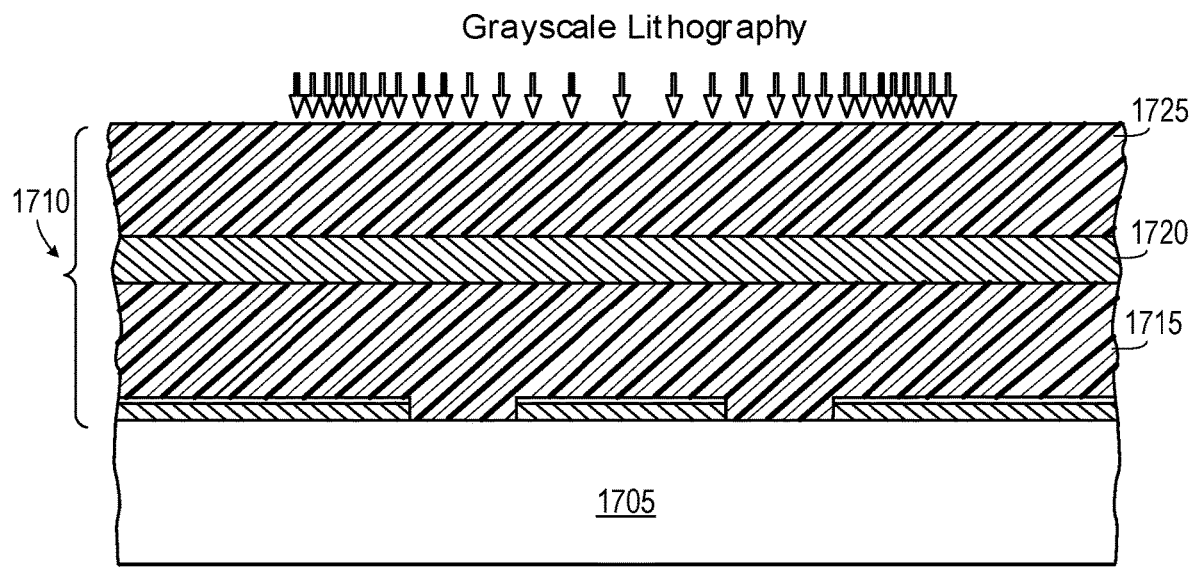
FIGS. 17-22 illustrate simplified cross-sectional views of steps associated with the formation of a shielded bridge according to the method described in FIG. 16.

As illustrated in FIG. 16, in step 1605 one or more layers of a first electron beam lithographic resist are deposited on a substrate using any appropriate manufacturing technique. Referring to FIG. 17, a substrate 1705 can be any insulative substrate, such as for example high-resistivity silicon. In some embodiments a first trilayer of resist 1710 is spun on to substrate 1705 where the trilayer includes a first layer 1715 of polymethyl methacrylate (PMMA), a middle layer 1720 of copolymer and a top layer 1725 of PMMA, however other embodiments can use different formulations and layers of resist. In some embodiments first layer 1717 can be approximately 1400 nanometers thick, middle layer 1720 can be approximately 500 nanometers thick and top layer 1725 can be approximately 1400 nanometers thick, however in other embodiments other suitable thicknesses can be used.

As illustrated in FIG. 16, in step 1610 3-D grayscale electron beam lithography is performed on the first trilayer of resist 1710. Referring to FIG. 17, portions of first trilayer of resist 1710 are exposed to an electron beam source. In some embodiments first trilayer of resist 1710 is sensitive to an electron beam lithography source such that any regions of resist that are exposed to the electron beam can be removed using a first "exposed resist" removal process and regions of the resist that are not exposed are "tenacious" and remain behind after the removal process. A subsequent resist removal process can be used to remove the tenacious portions by using a different chemical and/or removal process.

Figure 18:
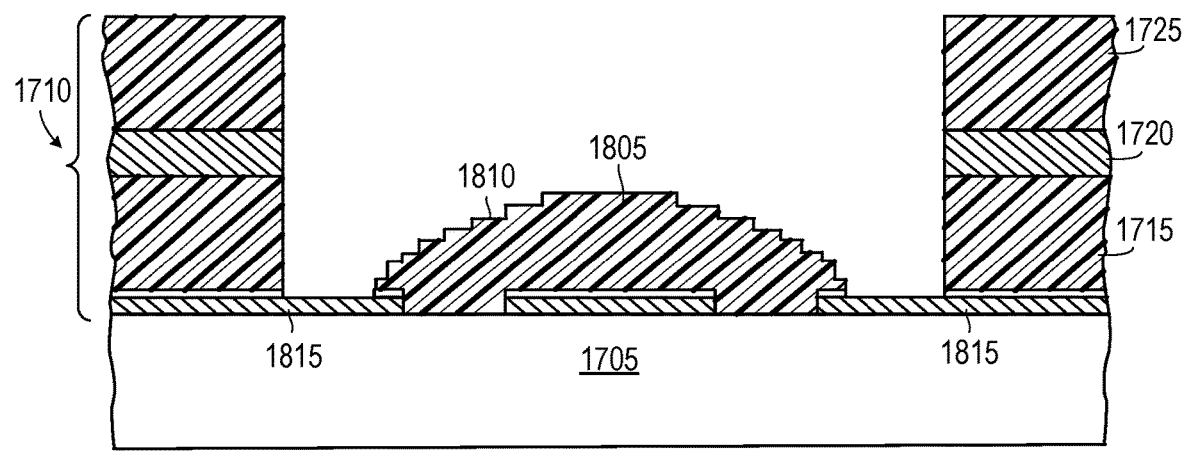

As illustrated in FIG. 16, in step 1615 exposed portions of first trilayer of resist 1710 are removed using any suitable process. Referring to FIG. 18, a tenacious portion 1805 of the resist remains, after removable portions of the resist have been removed. In this embodiment tenacious portion 1805 has a stair-stepped arcuate top surface 1810 and is aligned over one or more metal conductors 1815 on substrate 1705.

Figure 19:
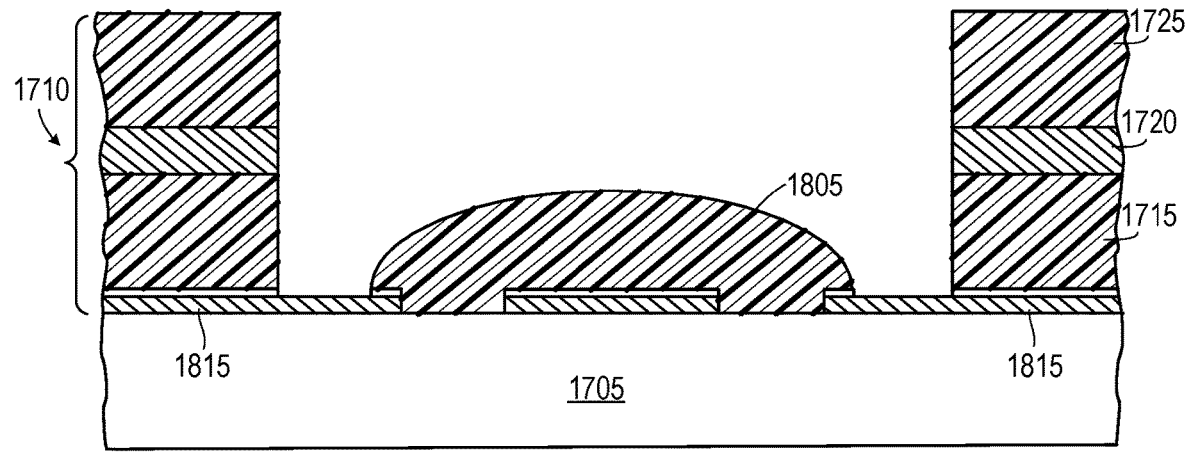

As illustrated in FIG. 16, in step 1620 tenacious portion 1805 of the resist is optionally reflowed. Referring to FIG. 19, in some embodiments it may be desirable to smooth out stair-step top surface 1810 (see FIG. 18) by exposing the assembly to elevated temperatures. In some embodiments the assembly is baked at 105 degrees centigrade for one hour, however other appropriate times and temperatures can be used. The baking can allow the resist to "flow" resulting in top surface 1810 becoming smooth, as shown in FIG. 19. In further embodiments this reflow step can be eliminated.

As illustrated in FIG. 16, in step 1625 ion milling is performed on one or more metal conductors 1815 to remove metal oxides on the conductors. Referring to FIG. 18, argon-based ion milling is performed on the entire assembly and is used to remove oxides on one or more metal conductors 1815. In other embodiments any other suitable process can be used to remove the oxides including a different type of ion milling, chemical etching, etc.

Figure 20:
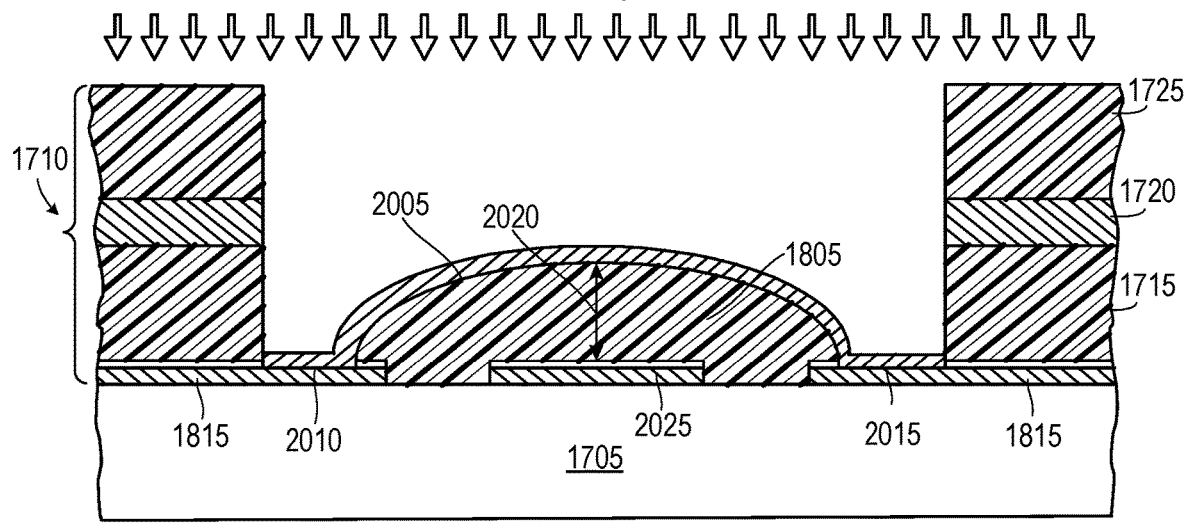

As illustrated in FIG. 16, in step 1630 metal is deposited to form a ground bridge. Referring to FIG. 20, metal can be deposited on tenacious portion 1805 of resist forming a ground bridge 2005 that is in electrical contact with a first termination region 2010 of one or more conductors 1815 and in electrical contact with a second termination region 2015 of the one or more conductors. In this particular embodiment first termination region 2010 and second termination region 2015 can be regions defined within one or more ground planes. In some embodiments the deposited metal is aluminum, however in other embodiments any other suitable metal can be used. In some embodiments steps 1625 and 1630 are performed while continuously under vacuum.

As illustrated in FIG. 16, in step 1635 tenacious portion 1805 of resist under ground bridge 2005 is removed using any suitable process. In some embodiments a different chemical formulation than was used in step 1615 above can be used to remove the tenacious portion of resist. Referring to FIG. 20, tenacious portion 1805 of resist is removed leaving a gap 2020 between ground bridge 2005 and substrate 1705. In some embodiments a gap 2020 is defined between ground bridge 2005 and a conductor 2025 on substrate 1705. In various embodiments gap 2020 can be approximately 1 micron, however in other embodiments any other suitable distance can be formed. In some embodiments a thickness of ground bridge can be less than one half micron.

Figure 21:
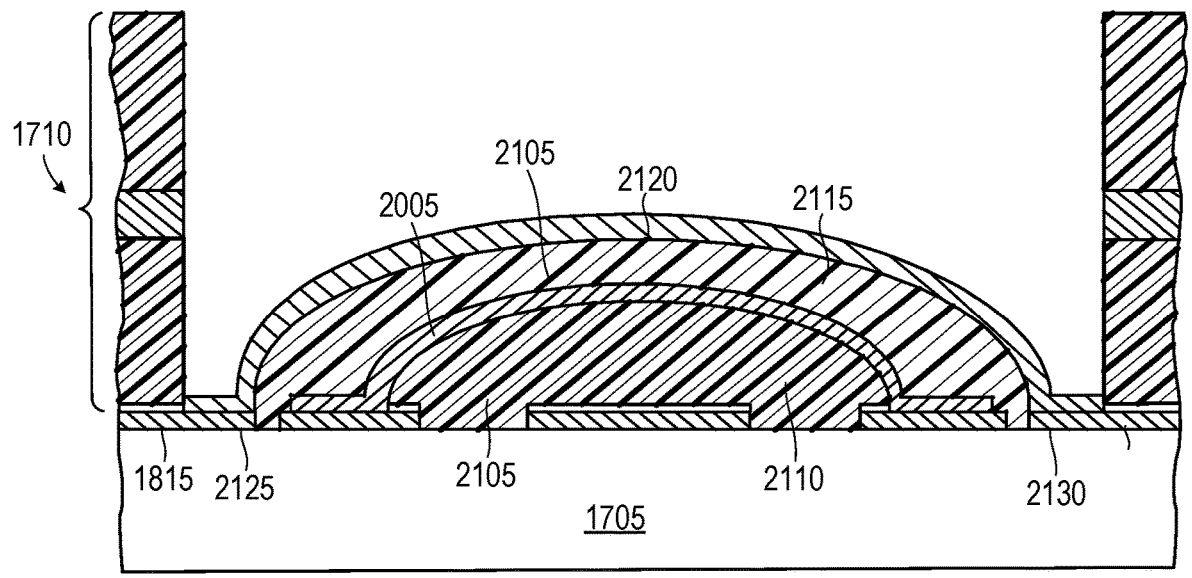

As illustrated in FIG. 16, in step 1640 one or more layers of a second electron beam lithographic resist are deposited on substrate 1705. Referring to FIG. 21, in some embodiments second resist 2103 can be identical to the first trilayer resist used in step 1605 and FIG. 17, however in other embodiments the second resist can be different.

As illustrated in FIG. 16, in step 1645 3-D grayscale electron beam lithography is performed on the resist similar to the lithography that was performed in step 1610. Referring to FIG. 21, portions of trilayer of resist are exposed to an electron beam source forming one or more tenacious portions 2105 of the resist. In some embodiments, one or more tenacious portions 2105 include portions below ground bridge 2110 and portions above ground bridge 2115.

As illustrated in FIG. 16, in step 1650 exposed resist is removed using any suitable process. Referring to FIG. 21, tenacious portions 2105 of resist remains, after removable portions of the resist have been removed. Similar to step 1615 described above, in some embodiments tenacious portion above ground bridge 2115 has a stair-stepped arcuate top surface and is aligned between one or more metal conductors 1815 on substrate 1705.

As illustrated in FIG. 16, in step 1655 tenacious portions 1805 of the resist are optionally reflowed. This step may use a similar process as described in step 1620 to optionally smooth out a top surface of tenacious portion above ground bridge 2115.

As illustrated in FIG. 16, in step 1660 ion milling is performed one or more metal conductors 1815 to remove any metal oxides on the conductors. Similar to step 1625 above, argon-based ion milling is performed on the entire assembly and is used to remove oxides on one or more metal conductors 1815. In other embodiments any other suitable process can be used to remove the oxides including a different type of ion milling, chemical etching, etc.

As illustrated in FIG. 16, in step 1665 metal is deposited to form a signal bridge. Referring to FIG. 21, metal can be deposited on tenacious portion 1805 of resist forming a signal bridge 2120 that is in electrical contact with a first terminal 2125 of one or more conductors 1815 and in electrical contact with a second terminal 2130 of the one or more conductors. In this particular embodiment first terminal 2125 and second terminal 2130 can be portions of coplanar waveguide signal conductors, as described above. In some embodiments the deposited metal is aluminum, however in other embodiments any other suitable metal can be used. In some embodiments steps 1660 and 1665 are performed while continuously under vacuum.

Figure 22:
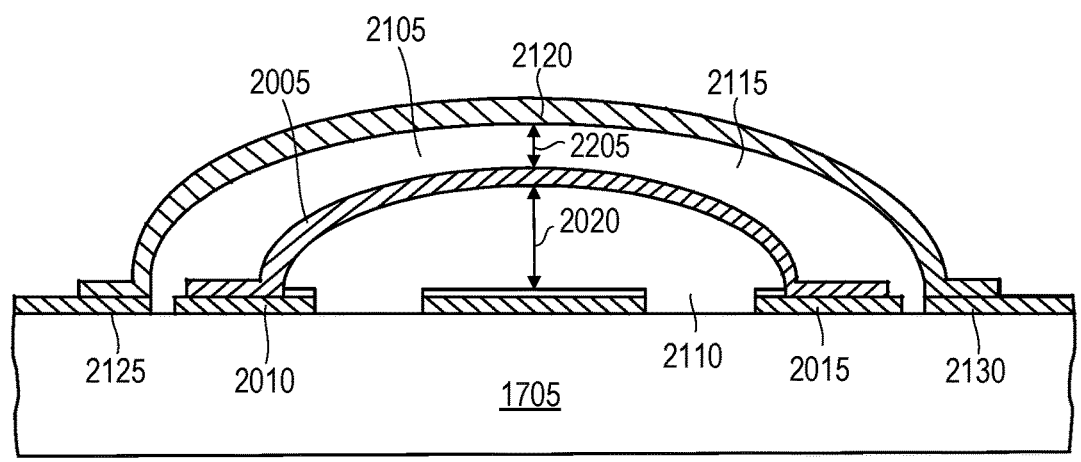

As illustrated in FIG. 16, in step 1670 tenacious portions 2105 of resist under ground bridge 2005 and under signal bridge 2120 are removed using any suitable process, similar to step 1635, above. Referring to FIG. 22, tenacious portions 2105 of resist are removed leaving a first gap 2020 defined between ground bridge 2005 and substrate 1705 and a second gap 2205 defined between signal bridge 2120 and ground bridge 2005. In various embodiments gaps 2020, 2205 can be approximately 1 micron, however in other embodiments any other suitable distance can be used. In some embodiments a thickness of ground bridge 2005 and signal bridge 2120 can be less than one half micron.

In the foregoing specification, embodiments of the disclosure have been described with reference to numerous specific details that can vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction. The specific details of particular embodiments can be combined in any suitable manner without departing from the spirit and scope of embodiments of the disclosure.

Additionally, spatially relative terms, such as "bottom" or "top" and the like can be used to describe an element and/or feature's relationship to another element(s) and/or feature(s) as, for example, illustrated in the figures. It will be understood that the spatially relative terms are intended to encompass different orientations of the device in use and/or operation in addition to the orientation depicted in the figures. For example, if the device in the figures is turned over, elements described as a "bottom" surface can then be oriented "above" other elements or features. The device can be otherwise oriented (e.g., rotated 90 degrees or at other orientations) and the spatially relative descriptors used herein interpreted accordingly.

What is claimed is:

1. A shielded bridge for a coplanar waveguide (CPW), the shielded bridge comprising:
    a signal bridge extending from a first terminal of the CPW to a second terminal of the CPW, the signal bridge having a raised central portion that extends over a separate signal conductor; and
    a ground bridge extending from a first ground plane on a first side of the separate signal conductor to a second ground plane on a second side of the separate signal conductor, the ground bridge positioned between the signal bridge and the separate signal conductor.

2. The shielded bridge of claim 1 wherein a first gap is defined between the separate signal conductor and the ground bridge and a second gap is defined between the signal bridge and the ground bridge.

3. The shielded bridge of claim 2 wherein the first and second gaps are filled with air.

4. The shielded bridge of claim 2 wherein a vacuum is present in the first and second gaps.

5. The shielded bridge of claim 2 wherein at least one of the first gap or the second gap are filled with a dielectric material.

6. The shielded bridge of claim 1 wherein a width of the signal bridge is equal to or greater than a width of the ground bridge.

7. The shielded bridge of claim 1 wherein a width of the ground bridge is greater than a width of the signal bridge.

8. The shielded bridge of claim 1 wherein the ground bridge is configured to shield the signal bridge from crosstalk between the signal bridge and the separate signal conductor.

9. The shielded bridge of claim 1 wherein the CPW comprises an XY drive line of a qubit circuit.

10. The shielded bridge of claim 1 wherein the signal bridge comprises one of a plurality of signal bridges extending from the first terminal of the CPW to the second terminal of the CPW.

11. The shielded bridge of claim 10 wherein the plurality of signal bridges comprises three signal bridges.

12. The shielded bridge of claim 11 wherein the ground bridge consists of a single ground bridge.

13. The shielded bridge of claim 1 the separate signal conductor comprises a transmission line.

14. The shielded bridge of claim 13 wherein the signal bridge conducts electromagnetic energy associated with the CPW across the transmission line.

15. The shielded bridge of claim 1 wherein the ground bridge includes a raised middle portion positioned between the first ground plane and the second ground plane.

16. The shielded bridge of claim 1 wherein a width of the signal bridge varies as the signal bridge extends from the first terminal of the CPW to the second terminal of the CPW.

17. The shielded bridge of claim 1 wherein a width of the ground bridge varies as the ground bridge extends from the first ground plane to the second ground plane.

* * * * *